(12) United States Patent
Van Gilder et al.

(10) Patent No.: US 6,758,678 B2
(45) Date of Patent: Jul. 6, 2004

(54) COMPUTER ENHANCED PLAY SET AND METHOD

(75) Inventors: Amy Van Gilder, Los Angeles, CA (US); Elizabeth A. Woods, Ithaca, NY (US)

(73) Assignee: Disney Enterprises, Inc., Burbank, CA (US)

( * ) Notice: Subject to any disclaimer, the term of this patent is extended or adjusted under 35 U.S.C. 154(b) by 264 days.

(21) Appl. No.: 09/929,254

(22) Filed: Aug. 14, 2001

(65) Prior Publication Data

US 2003/0034955 A1 Feb. 20, 2003

(51) Int. Cl.⁷ .............................................. G09B 25/00
(52) U.S. Cl. ..................... 434/365; 434/307 R; 463/30; 345/112
(58) Field of Search ............................ 434/307 R, 308, 434/365, 393; 463/1, 30–33, 36, 48; 273/148 B; 446/99; 345/156, 157, 174, 184; 348/586; 725/153; 312/7.2, 204; 40/594; 178/18.01

(56) References Cited

U.S. PATENT DOCUMENTS

| | | | | |
|---|---|---|---|---|
| 4,293,734 A | * | 10/1981 | Pepper, Jr. ............... | 178/18.01 |
| 4,931,782 A | * | 6/1990 | Jackson ...................... | 345/174 |
| 5,072,998 A | * | 12/1991 | Oh .............................. | 312/204 |
| 5,398,905 A | | 3/1995 | Hinson | |
| 5,464,214 A | * | 11/1995 | Griffin ..................... | 273/148 B |
| 5,564,209 A | * | 10/1996 | Zagnoli ....................... | 40/594 |
| 5,790,124 A | | 8/1998 | Fischer et al. | |
| 5,825,347 A | | 10/1998 | Prinsen | |
| 5,986,675 A | | 11/1999 | Anderson et al. | |
| 6,005,548 A | | 12/1999 | Latypov et al. | |
| 6,076,734 A | | 6/2000 | Dougherty et al. | |
| 6,118,459 A | | 9/2000 | Hunter | |
| 6,160,540 A | * | 12/2000 | Fishkin et al. .............. | 345/184 |
| 6,288,753 B1 | * | 9/2001 | DeNicola et al. ........... | 348/586 |
| 6,290,565 B1 | * | 9/2001 | Galyean, III et al. ......... | 446/99 |
| 6,415,439 B1 | * | 7/2002 | Randell et al. ............. | 725/153 |

* cited by examiner

*Primary Examiner*—Joe H. Cheng
(74) *Attorney, Agent, or Firm*—Hogan & Hartson, LLP

(57) ABSTRACT

A computer enhanced play set. Computer enhanced play set incorporates a structure and display screen images retrieved from a CD-ROM, Internet, or other source. Structure and display screen images and/or sounds portray various play set scenes or themes. Movements within the play set may be tracked with sensors. Movement data is provided to computer data inputs of a computer system. Based on movement data, different images, scenes, or scripts may be generated. Users interact with the attached structure and display screen images. User interaction is realized based on the configuration and content of structure and images in display screen. Interaction with the enhanced computer play set may occur between a user and display screen, between a figure and display screen, between a user and structure, between a figure or object and structure, between a user and both structure and display screen, and between a figure or object and both structure and display screen. In addition, actual external human activities may be represented within computer enhanced play set, and users may indirectly interact with human activities through the computer.

20 Claims, 16 Drawing Sheets

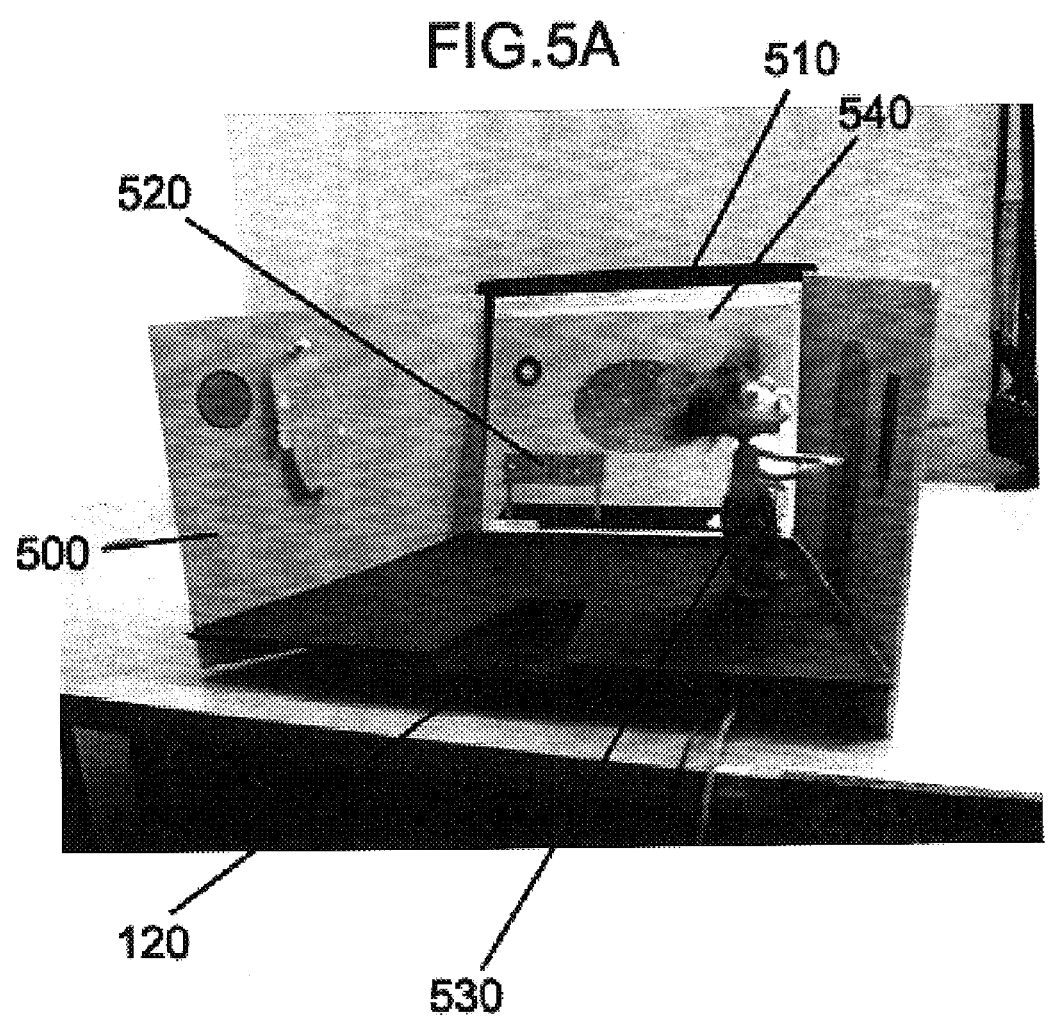

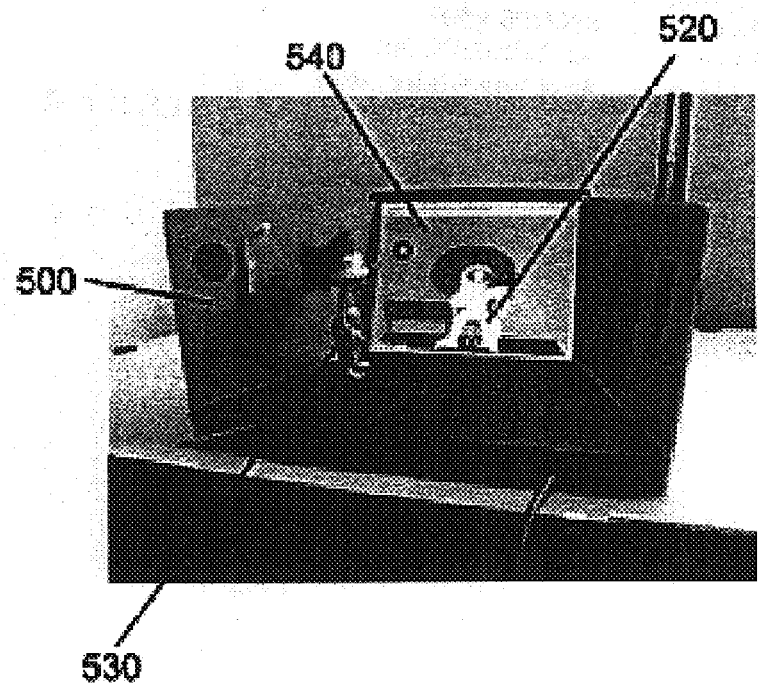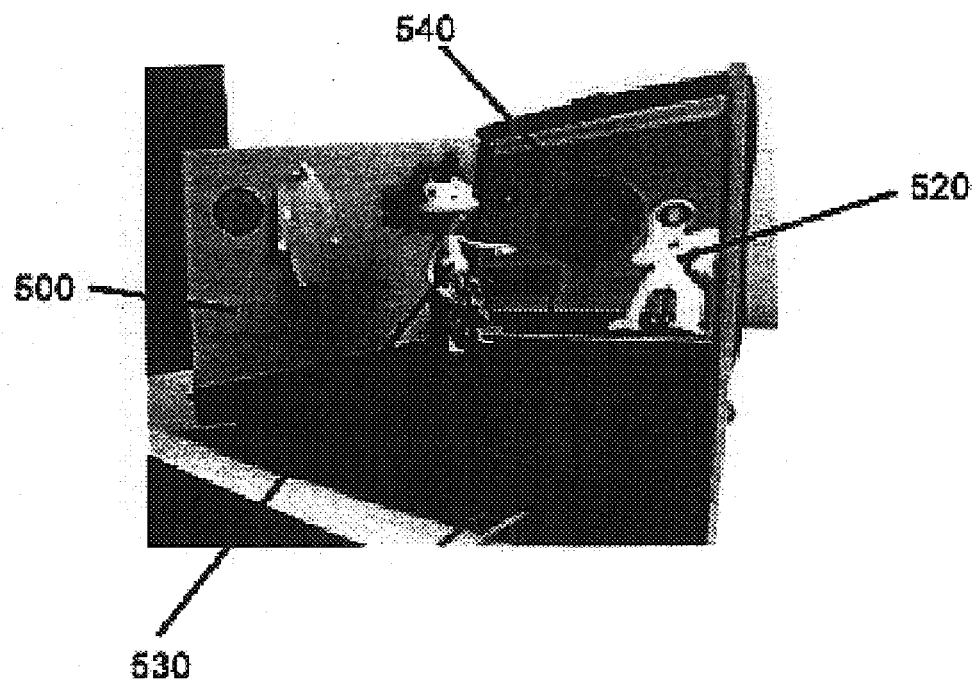

710   730   720

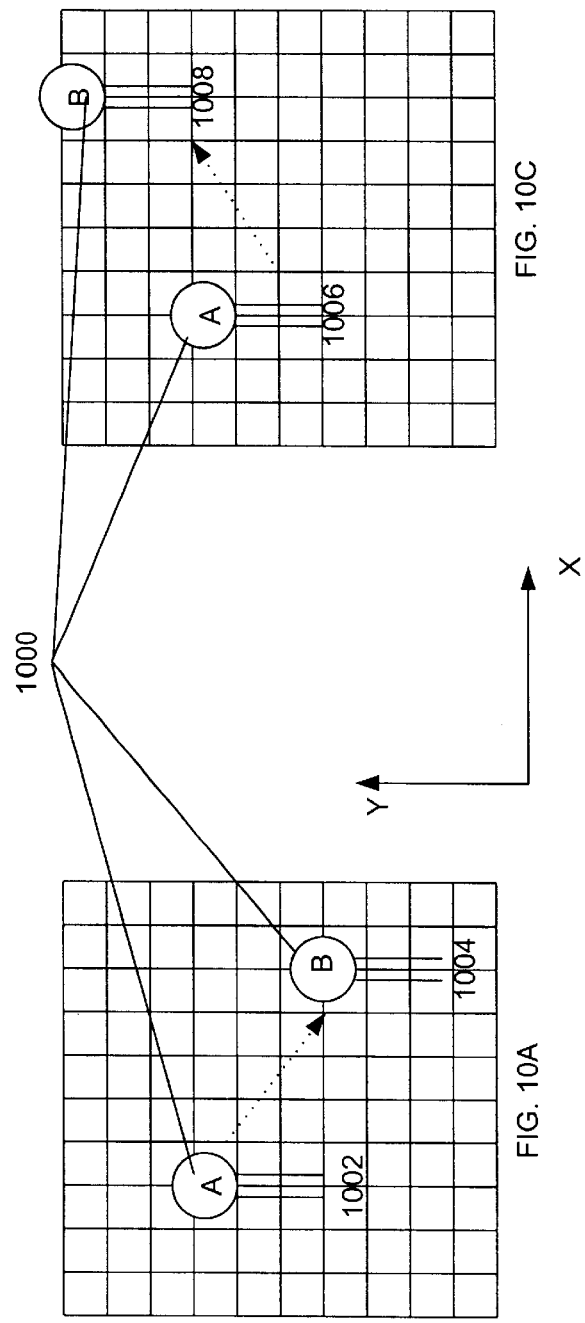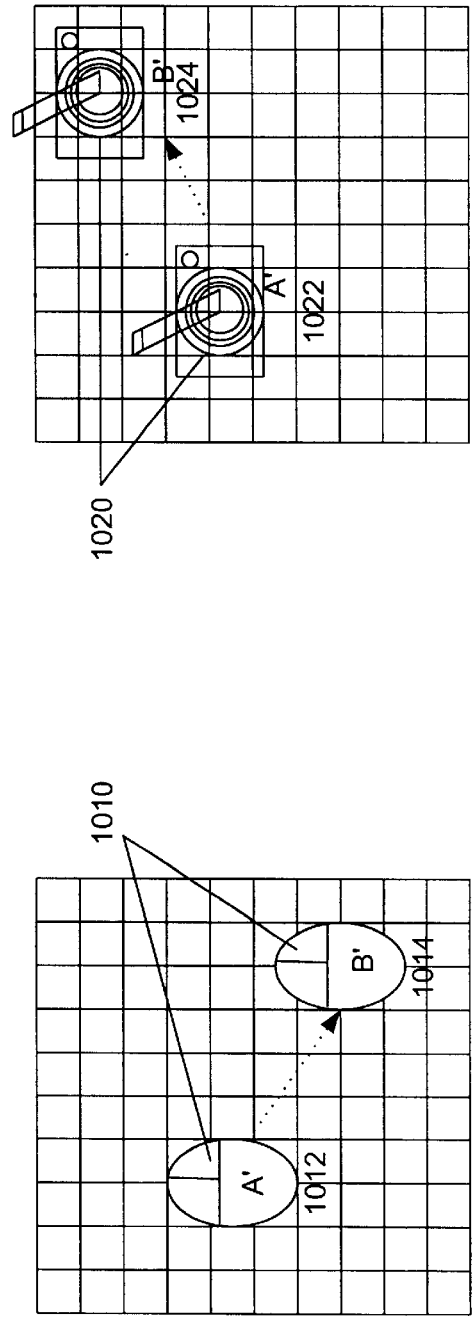
FIG. 10A
FIG. 10B
FIG. 10C
FIG. 10D

COMPUTER ENHANCED PLAY SET AND METHOD

FIELD OF THE INVENTION

This invention relates in general to play sets, and in particular, to interactive computer play sets.

DESCRIPTION OF RELATED ART

Toys and play sets are becoming more sophisticated as children grow up in environments which are increasingly influenced by computers. However, one type of toy that has not been influenced or modified by computers is a traditional play set play environment. Instead, children are still limited to playing with characters or figures within a predefined and limiting physical structure or play set. One example of such a predefined structure is a typical doll house. These play environments are limited in entertainment ability compared to other computer related toy or entertainment systems.

Conventional systems have attempted to provide interactive play environments. For example, in one conventional system, figures are moved and tracked to duplicate images on a computer monitor. However, such systems lack interactive elements. The display screen is merely utilized to duplicate play moves already implemented by the user. In other words, the monitor merely serves as an adjunct component rather than an interactive element.

Other conventional systems enable users to create virtual structures such as buildings. The pieces of these virtual structures are then printed out. A user can then assemble the structure by cutting and shaping the printed pieces resulting in a real world building. However, as in the previously described systems, the duplication element still exists, and user interaction with a computer or computer screen is lacking. Play sessions cease once the building is erected from the paper pieces.

Other conventional systems have integrated simple structures to computer components, such as a computer monitor. However, these structures are primarily used for simple decorative or utility purposes (e.g., a patterned or floral border around a computer screen). Other conventional systems include a computer monitor with a surrounding border, and the surrounding border completes a partial image displayed on the computer screen. The displayed partial image and the partial image of the surrounding structure define a single, complete image. A new single, complete image can only be implemented either with a new display image that also matches the surrounding border or with an entirely different display screen image and new corresponding border. Thus, only one complete image can be represented at any one time, and image changes may require manual modifications to borders. Yet other conventional systems have integrated physical objects to a computer screen for utility purposes. Examples of such objects include storage bins, document holders, and pencil holders. However, these items are limited, inconvenient, and void of user interaction or input.

The link between play sets and computers has yet to be effectively implemented. Accordingly, there is a need in the art for an enhanced computer play set. An enhanced computer play set should be adaptable to current computer systems and be simple to use since the play set will often be used by children. An enhanced computer play set should provide new levels of user interaction with images or events portrayed in a computer screen.

SUMMARY OF THE INVENTION

An apparatus and method for interactive entertainment includes a computer system with a display screen and a structure coupled to the display screen. Images in display screen and the structure form the interactive entertainment environment. Images may be retrieved from Internet, CD-ROM, or other storage medium, and displayed on display screen.

Movement within computer enhanced play set may be tracked with sensors in two dimensions. Two dimensional movement or sensor data is provided using computer inputs such as a mouse, a joystick, a touchpad, and a touchscreen. Based on input data, or after a predetermined amount of time, different images, sequences of images, scenes, scripts, themes, etc. may be presented on display screen. User may interact with new scenes or images randomly or following a sequence or script.

BRIEF DESCRIPTION OF THE DRAWINGS

Referring now to the drawings in which like reference numbers represent corresponding parts throughout:

FIGS. 5A–C illustrate different angles and scenes of a computer enhanced playset configured for a laptop computer;

FIGS. 10A—D are schematics illustrating how movements of figures in two dimensions are related to preexisting two dimensional input devices;

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Hardware Environment

Figure 1:
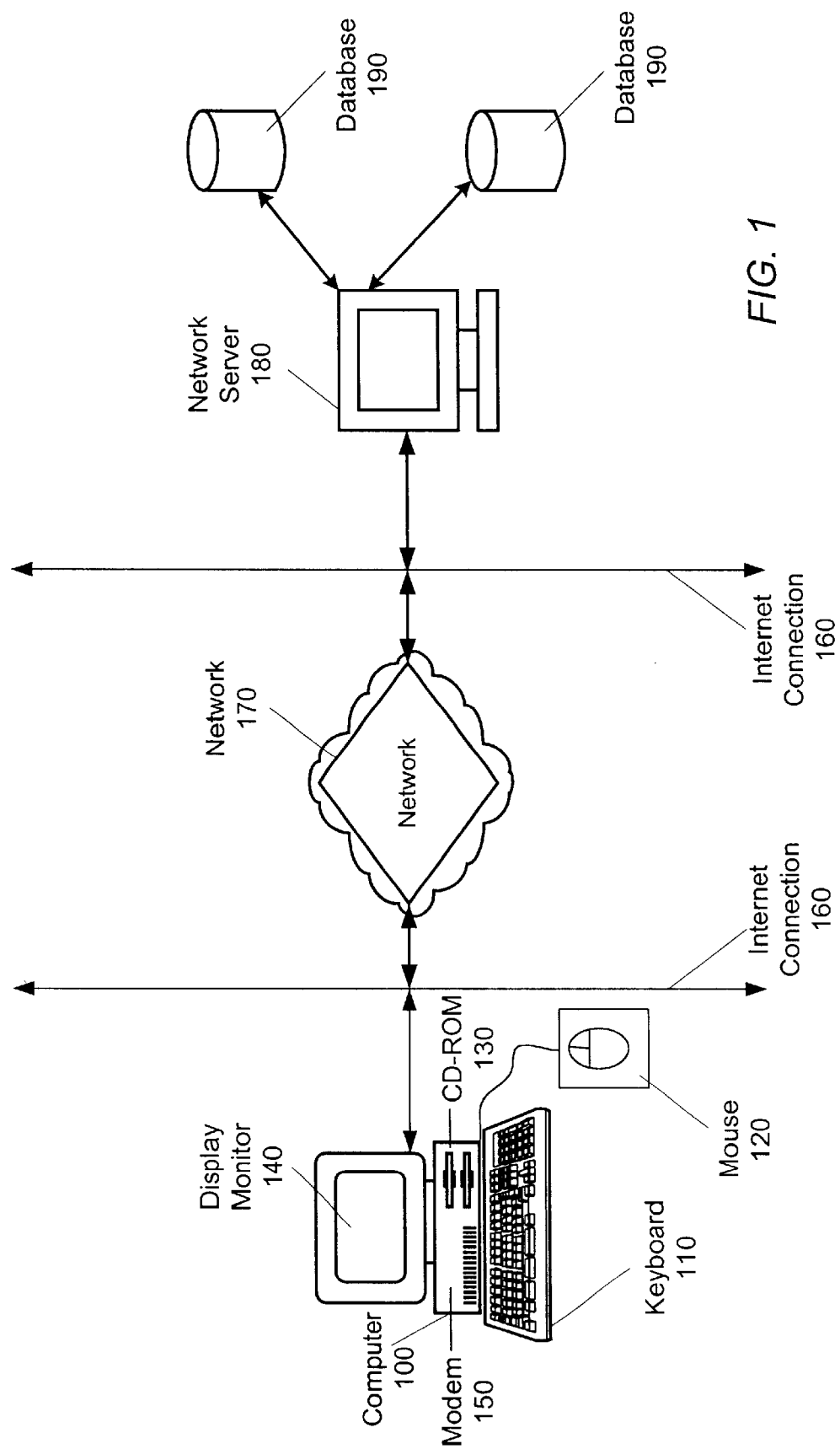
FIG. 1 is a schematic of a typical distributed computer system.

FIG. 1 is a schematic diagram illustrating a hardware environment in which one embodiment of the present invention may be implemented. One embodiment of the present invention provides an enhanced computer play set. An enhanced computer play set is implemented using a personal computer 100 or work station equipped with a keyboard 110, mouse 120, or other input device, a storage device 130, such as a tape drive, disk drive, or CD-ROM, a monitor 140, and a modem 150 to transmit and receive information from Internet 160 over network 170 to and from a network server 180 or platform computer which is coupled one or more databases 190. In response to input data, computer 100 may retrieve data stored on storage device 130 or from network server 18 and/or database 190 with modem 150 via the Internet 160. Retrieved data may then be displayed on display monitor 140.

The Internet 160 connection might comprise conventional telephone lines, ISDN lines, ADSL lines, DSL lines, cable connection, satellite connection, and the like. Alternatively, the user may use a television equipped with a set top box ("STB") with Internet 160 capabilities equipped with a control unit to transmit and receive information via the 160 connection. One example of an STB with Internet 160 capabilities is sold under the trademark WebTV® by Microsoft Corporation, One Microsoft Way, Redmond, Wash.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Computer Enhanced Playset

One embodiment of the present invention provides an enhanced computer playset. Following is a detailed description of the structure of computer enhanced play set and how the play set structure is utilized with computer display screen images enabling user interaction with play set structure and/or display screen images.

Figure 2A:
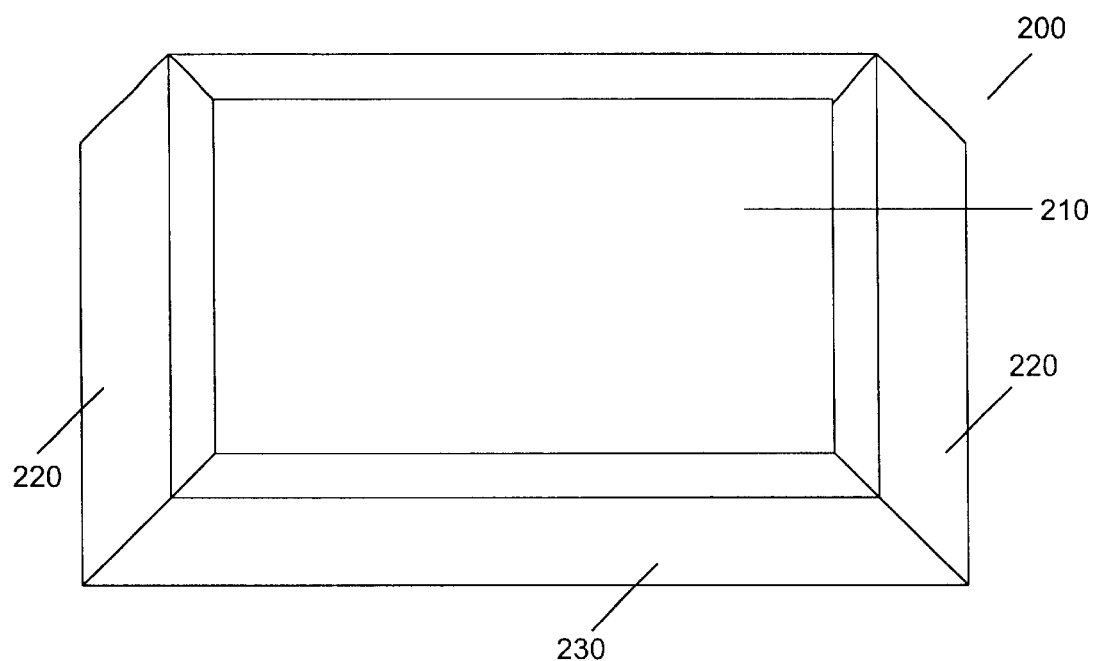
FIGS. 2A–B are schematics illustrating different examples of an enhanced computer play set structure.
Figure 2B:
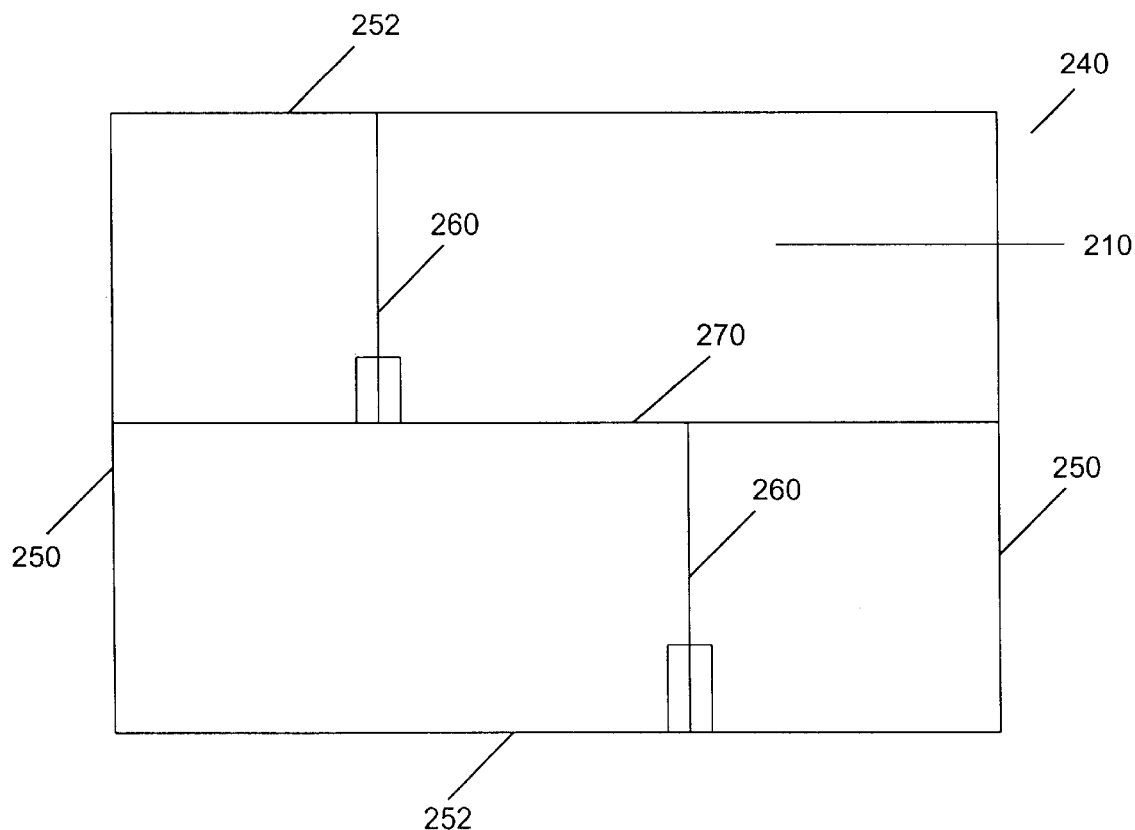

FIGS. 2A and 2B illustrate two possible configurations of the structure of an enhanced computer play set. Referring to FIG. 2A, structure 200 of computer enhanced play set is coupled to or fit to display monitor 210 of computer 100. Play set structure 200 includes vertical wall pieces 220 extending from the front of display monitor 210. Base piece 230 joins vertical wall pieces 220. Base 230 may also be joined to display monitor 210. In yet another alternative embodiment, structure 200 includes two vertical pieces 220 and a roof or top piece (not illustrated) instead of or in addition to base 230. In yet another alternative embodiment, structure 200 includes at least one vertical piece 220 and at least one horizontal piece 230. Indeed those skilled in the art will recognize that various play set structure 200 configurations may be utilized. For example, although structure 200 is illustrated with vertical walls 220 flared outward from display screen 210, vertical walls 220 could also be arranged as a square or flared inward.

With reference to FIG. 2B, a different play set structure 240 includes external vertical walls 250 and external horizontal walls 252. Structure 240 also includes two internal vertical walls 260 and an internal horizontal wall 270. Internal walls 260, 270 may form, for example, rooms within a house connected by doors. When structure 240 is coupled to or aligned with display screen 210, the back wall of the structure is completed by images in the display screen 210. Indeed, those skilled in the art will recognize that various internal structural configurations may be implemented. For simplicity, although there are numerous play set structure configurations, this specification will refer to play set structures generally as play set structure 200 or structure 240.

Play set structure 200 may be coupled to the display screen 210 in different manners. For example, structure 200 may be physically attached to the front or sides of display screen 210 with tape, glue, velcro, magnets, suction cups, and other attachment devices. Alternatively, structure 200 wall pieces may be configured to match display screen 210 such that they are not actually physically coupled to display screen 210, e.g., structure 200 pieces are flush to or aligned with display screen 210. As a result, structure 200 may rest on a desk or table without actually being attached to display screen 210. For simplicity, this specification refers to structures attached or coupled to display screen 210.

Further, play set may be configured for both desktop and laptop computers. For example, the two example structures 200 and 240 may be attached to either a display screen of desktop computer or to a display screen of a laptop computer. With a laptop computer, base of structure 200 may rest on top of the keyboard of the laptop computer. With a lap top computer, base of structure 200 may also be configured such that a touchpad mouse 12 is still accessible to user. Indeed, those skilled in the art will recognize that various structure and display screen configurations are possible.

Different types and levels of user interaction result from the configuration and content of structure 200 and images in display screen 210. For example, interaction with the enhanced computer play set may occur between a user and display screen 210, between a figure and display screen, between a user and structure 200, between a figure or object and structure 200, between a user and both structure 200 and display screen 210, and between a figure or object and both structure 200 and display screen 210. Thus, an interactive play set environment is created between the user or figure under control of the user and play set structure 200 and/or images in display screen 210.

Within any of the previously listed configurations, images may occur randomly or in response to movements of figures or objects, new images may be displayed in display screen 210. New images may be retrieved via Internet 160, or from any storage medium 130 such as a CD-ROM or diskette. These images may be static or dynamic, changing in response to user input, movement of objects, or after a predetermined amount of time. Thus, a first image, sequence of images, scene, script, theme, setting, etc. may be presented. For example, a first image, sequence of images, scene, script, theme, setting may relate to a doll house or a space ship setting. A user may move an object or figure triggering a second image, sequence of images, scene, script, theme, or setting, and so on, resulting in a series of different images and sounds provided to a user. For simplicity, this specification refers to a scene or theme, although those skilled in the art will recognize that various other presentations may be implemented with the present invention. Following is a more detailed description of the structures and related images that enable interactive play.

Figure 3A:
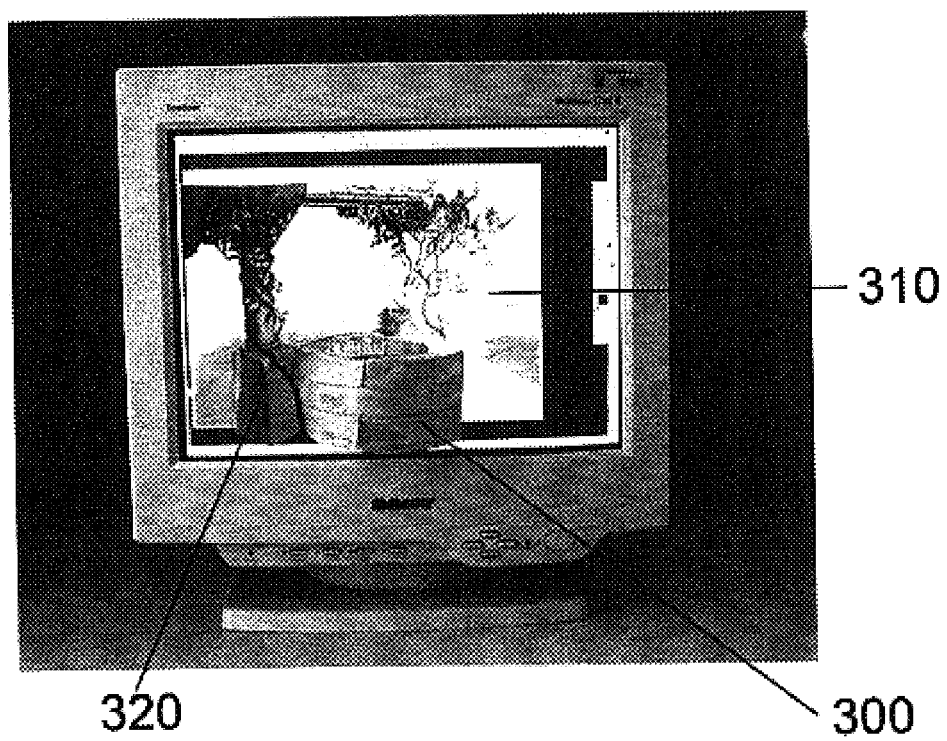
FIGS. 3A–B illustrate examples of structures added to a display screen to form a three dimensional play space on a computer monitor.
Figure 3B:
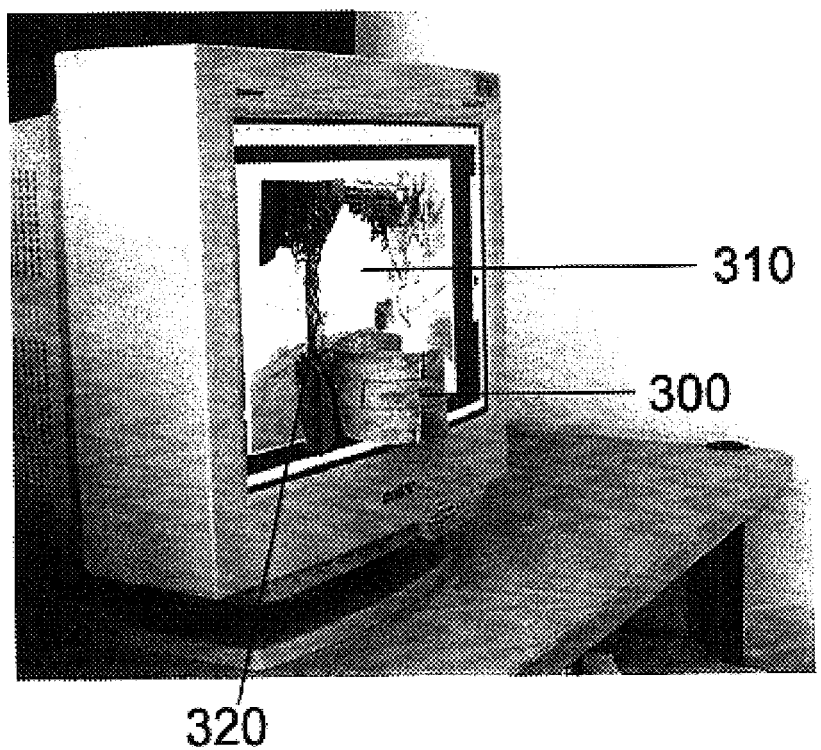

FIGS. 3A–B illustrate different views of a "plant on" structure 300 attached to display screen 310. Display screen portrays a partial image of a well 320 and background scenery 330 related to the well. Structure 300 is also a partial well that matches the well portrayed in display screen 310. Attaching structure 300 to display screen 310 matches the partial image 320 of the well to form a complete image of a well. The complete well includes both virtual components in display screen 310 and real, physical structural components 300. Users may then play and interact with the enhanced computer play set formed by the physical well structure 300, the well image 320, and surrounding background 330 in display screen 310. Indeed, those skilled in the art will recognize that plant ons to display screen may complete numerous other images, and that the present example is merely illustrative of many applications.

Figure 4:
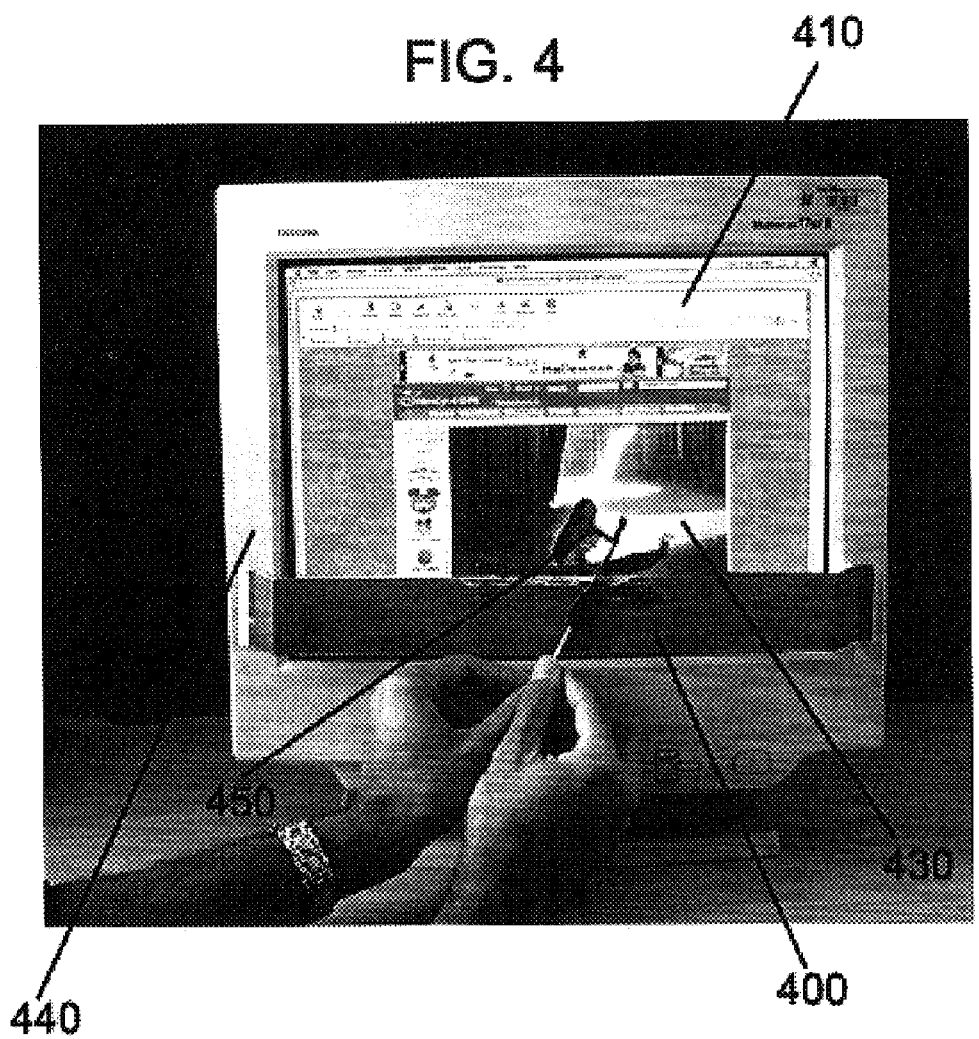
FIG. 4 illustrates an additional example of structures added to a display screen enhancing images from the Internet to form a three dimensional play space on a computer monitor.

As a further example, in FIG. 4, a play set structure 400 represents a canoe with a moveable oar and water which are attached to display screen 410 to portray a river scene. The play set structure is attached to the display screen 410 to match the position of the canoe and water structure 400 within the river scene background 430 portrayed on the display screen 410. As the background 430 changes, a user may manipulate a separate play figure 450, such as a puppet, of a woman with a paddle. The background 430 may be based on a script or an animated sequence retrieved from the Internet 160, CD-ROM 130, etc. For example, background 430 scenery may change such that other boats or characters appear. In addition, words or songs may scroll across the display screen 410 such that a user can read or tell a story or sing a song as the user plays with the puppet paddling down the river background 430. For other figure 450 movements, the scenes or images in scenes may remain the same and only change in response to different figure movements.

FIGS. 5A–C illustrate multiple views of yet another example of an enhanced computer play set. This example play set portrays different scenes relating to a spaceship play environment. This particular play set structure 500 includes a base and two vertical walls fitted to a screen 510 of a laptop computer 100. The structure 500 includes cutouts over touch mouse 120 to enable user input. In the illustrated example, the play set structure 500 walls are decorated with a spaceship environment. Display screen 540 displays images 520, retrieved from sources such as Internet 160, CD-ROM 130, or another source, that may follow a script or sequence related to the space environment. User may then interact with structure 500 and images 520 with figure 530.

For example, FIGS. 5A–C include images 520 of the continued floor and back wall of a space ship, squawk box, control panel, and a window with a view into outer space. Then, for example, according to a script or sequence, activities occur on the display screen 510 such as another space person entering the room or an alien monster appearing at the window. The user manipulating the figure 530 can then react to the action and play by interacting with the images and/or sounds through the display screen 510 configured as a touch screen or voice recognition commands. Thus, with the figure 530, a user interacts with the play set structure 500 and images 520 on the display screen 540 of the laptop computer 100.

Figure 6:
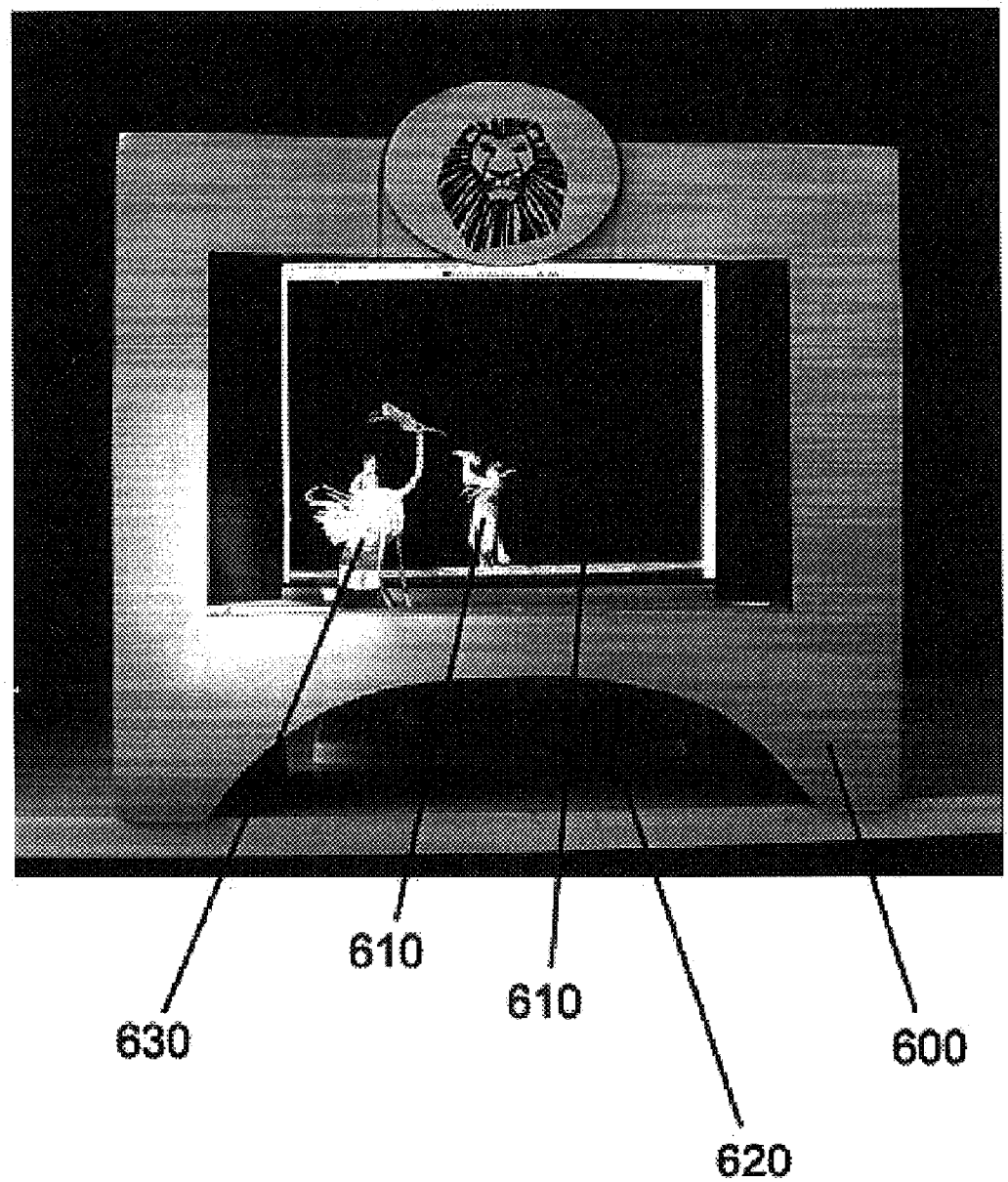
FIG. 6 illustrates an attachment to the front and border of a computer monitor forming an enhanced computer play set that is a theater stage.
Figure 7:
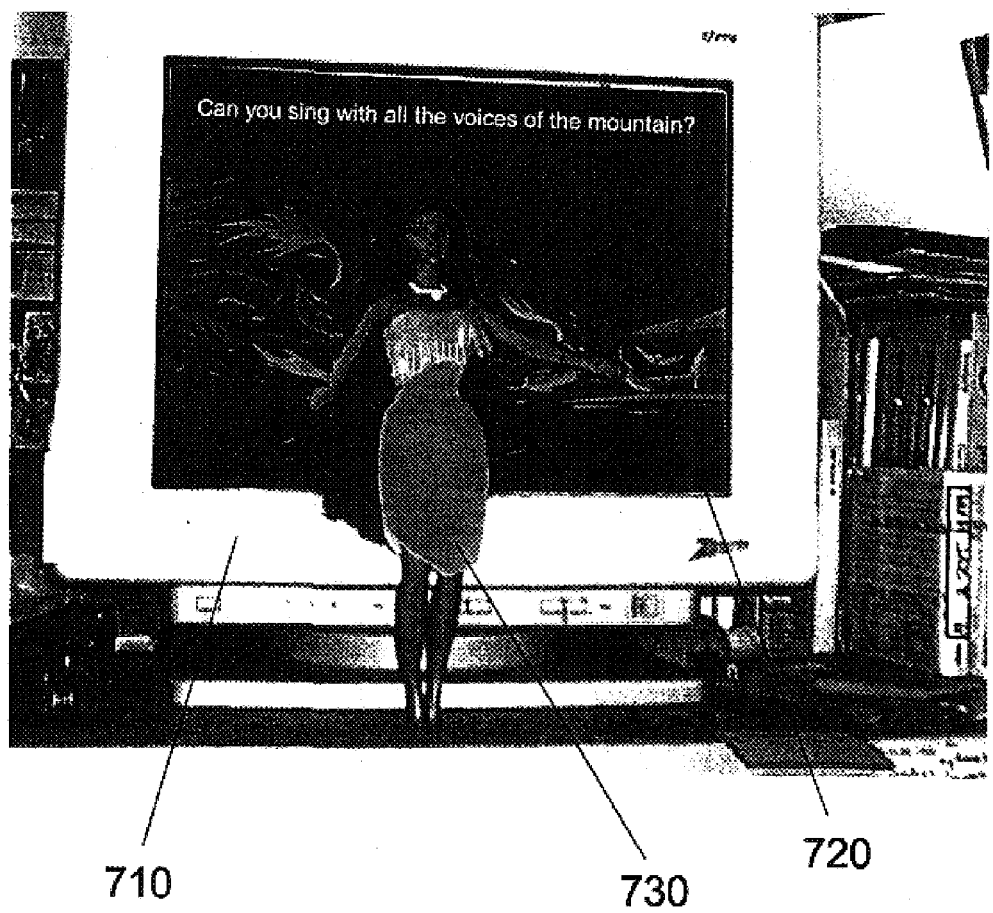
FIG. 7 illustrates how a user utilizes a computer enhanced play set based on interactive computer media.

With reference to FIG. 6, play set structure 600 may be configured to surround display screen 610 of a computer monitor 620. In this example, the display screen 610 projects images from the stage production of the musical The Lion King® of Walt Disney Company, 500 South Buena Vista Street, Burbank, Calif. A user, with puppet figure 630, interacts with the play set structure 600 and display 610 images as if the figures were on the actual stage of The Lion King®. The play set is designed such that the floor of the play set structure 620 serves as the stage on the monitor. The floor of the play set structure 620 may be configured with tracking devices such as electromagnetic sensors. Thus, when the puppet 630 is inserted into the stage, a signal identifying the location of the puppet 630 may be provided to the source of the images, e.g., CD-ROM 130, allowing the activities on the monitor 620 to respond to and interact with the puppet FIG. 630. Other attributes of an enhanced computer play set are illustrated in FIG. 7. Display screen 710 may display images 720 retrieved from Internet 160 or CD-ROM 130 that are images combined with words to a song. A user playing with a figurine 730 or doll may sing along with the words shown on the display screen 710 as if the figurine 720 was actually singing. In an alternative embodiment, the figurine 730 may be equipped to serve as a mouse 120. In this embodiment, the activities on the screen could follow the movement of the figurine 730 because the computer 100 could determine the position of the figurine 730 based on the mouse 120 data. Thus, the animated art on a CD-ROM 130 or other source could be programmed to respond to and follow the position of the figurine 730.

Figure 8:
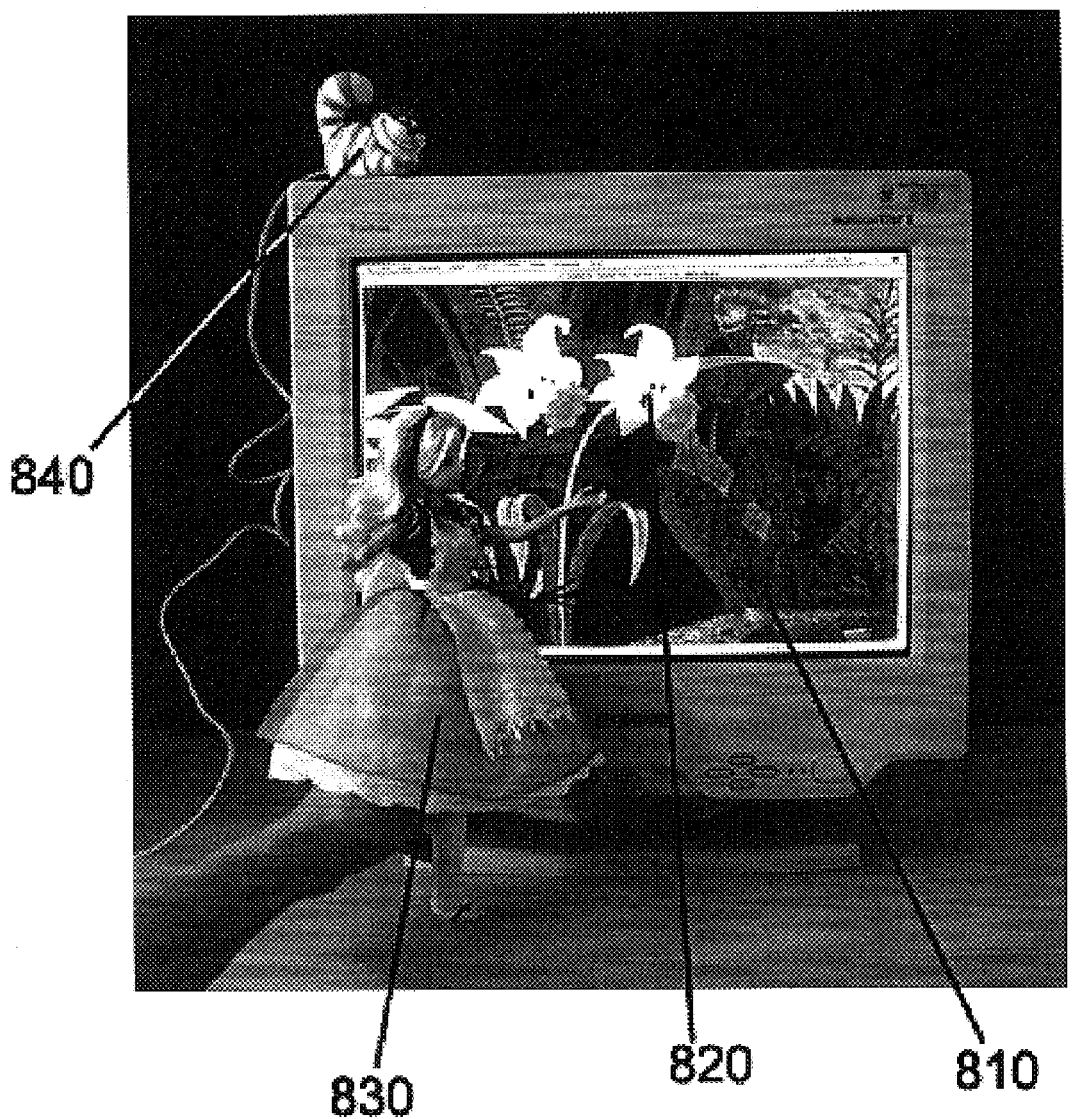
FIG. 8 illustrates how a user interacts with computer media with a figure and receives prompts from a plug in as to the sequence of the media.

In yet another embodiment, as illustrated in FIG. 8, display screen 810 may display images 820 from a movie or other animated media. For example, a user may play with a figurine or doll 830, originally from the movie or animated media, in real time in the foreground against the digital background of the movie presented on the display screen 810. In addition, a character plug-in 840, which may be plugged into a mouse 120 port or other data input port of computer 100. The character plug-in 840 may be, for example, a character from the movie or original media. The character plug-in 840 may be programmed to audibly prompt a user as to the sequence of the media. For example the character plug-in 840 may guide the user with stage direction to enable the user to perform with the script or program received from Internet 1670 or CD-ROM 130.

Proceeding to the next level of interactive complexity, the position of figures or objects within an enhanced computer play set structure may be tracked. Based on figure movements, new images and/or sounds may be provided. In one embodiment of the present invention, the enhanced computer play set may track movements in two dimensions (2D). In an alternative embodiment of the present invention, three dimensional (3D) movements may be tracked.

Figure 9:
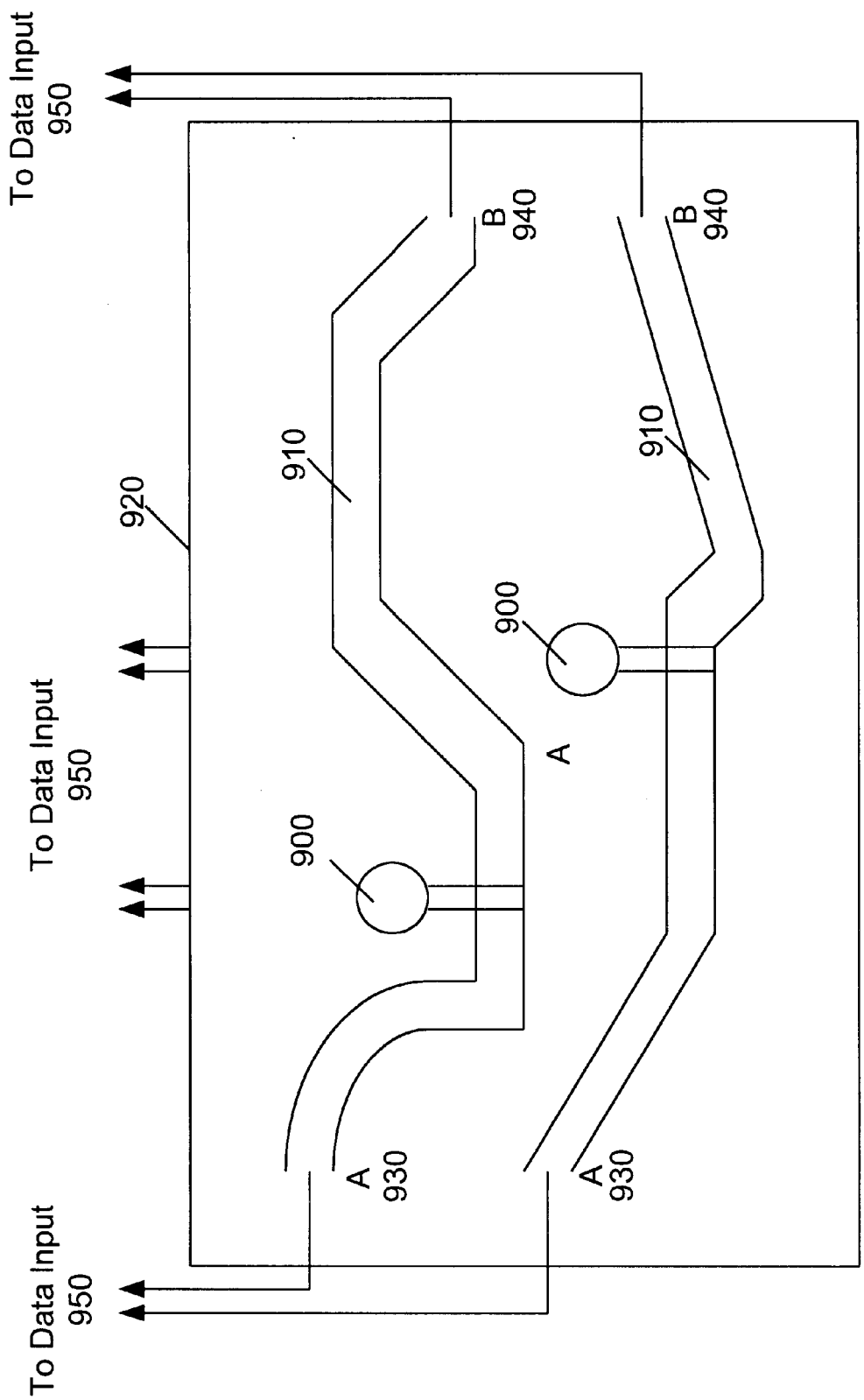
FIG. 9 is a schematic illustrating how movements of figures are tracked in two dimensions through connections in the base of a play set structure of an enhanced computer play set.

Two dimensional figure tracking may be performed using preexisting data inputs to computer system. In one embodiment of the present invention, as illustrated in FIG. 9, two dimensional tracking is performed using electrical connections between the figure and the base of the play set structure. More specifically, figure 900 slide along predefined grooves 910 in base of play set structure 920 in a two dimensional plane, e.g., a horizontal plane or a vertical plane. Electrical connections between figure 900 and grooves 910 are created. figure 900 movements along a groove 910 from point A 930 to point B 940 creates an electrical signal. Electrical signal is provided to data input 950, e.g., mouse 120, joystick, or touchpad of computer system 100. Based on input 950 data, the movement and position of figure 900 are determined in the two dimensional space of the structure 920 base. In response to a position change, a different image may be retrieved from Internet 160 or CD-ROM 130 and displayed on display screen.

For example, play set structure 920 may be a typical doll house with figure 900 initially placed at position A 930 in the left side of the house. Display screen shows a door at the position B 940—the opposite side of the house. If a sequence in a script from CD-ROM 130 rings a doorbell, the user moves figure 900 from position A 930 to position B 940 as if to walk across the room and answer the door. When figure 900 is moved along groove 910 to position B 940, in response to the movement and position determination of figure 900, the next sequence in the CD-ROM 130 script may be invoked to provide images of the door opening, and a virtual image of a figure entering the house. Further interaction may then be portrayed based on figure 900 movements interacting with virtual figure at the door. For example, as figure 900 moves back along groove 910 from position B 940 to position A 930, computer images of the virtual image following figure 900 from point B 940 to point A 930 may then be retrieved from CD-ROM 130 in response to movement data. Of course, other settings and themes may be implemented. Further, those skilled in the art will recognize that various "scripts" of sounds and/or images may be generated as interactive images, background images, sound, or music.

Additionally, tracking may be performed with optical components rather than electrical components. Further, tracking may be performed with various types of input devices including, but not limited to, a mouse 120, joystick, touchpad, and touchscreen. Following is a more detailed description of the manner in which computer data inputs may be utilized for two dimensional tracking.

With reference to FIGS. 10A–D, data corresponding to two dimensional movements of figures or objects 1000 in play set serves as input data to movements of corresponding input devices based on a two dimensional or X-Y coordinate system such as a mouse 1010 or joystick 1020. Movements of a mouse 1000 within the X-Y coordinate moves a cursor corresponding to the mouse 1000 movement in a corresponding X-Y plane—the display screen. Similarly, joysticks 1010 are also based on the same X-Y coordinate system, and movement is based on the direction and duration of the indicated direction.

More specifically, data corresponding to two dimensional movement of a figure 1000 from position A 1002 to position B 1004 is provided to a preexisting mouse 1010 input port of computer system 100. Input data represents a corresponding mouse 1010 movement within X-Y coordinate from position A' 1012 to position B' 1014. Similarly, movement of a figure or object 1000 within X-Y coordinate from position A 1006 to position B 1008 is represented as data corresponding to a movement of a joystick 1020 in X-Y coordinate from position A' 1022 to position B' 1024. Thus, movement of a figure 1000 within the two dimensional X-Y plane can be provided to a mouse 1010 data input, joystick 1020 data input, or other computer system 100 data inputs. This movement data is interpreted and based on the input data, a CD-ROM 130 or Internet 160 may be prompted to retrieve a different scene or script.

Continuing with reference to FIG. 11, two dimensional movement data may also be represented as touch pad 1100 or a touch screen (not shown) data. As illustrated, a touch pad 1100 is generally used on a table, desk, or other flat surface. With a touch pad 1100, a user may slide a figure from position A to position B on touch pad 1100. Data corresponding to this movement is provided to data inputs of computer 100 configured to receive touch pad 1100 data. In response to this movement data, images may be retrieved from Internet 160 or CD-ROM 130.

Those skilled in the art will recognize that a touch screen may be similarly utilized. Instead of resting on a table or other flat surface, a touch screen is coupled to display screen of computer system 100. Movements from different positions of touch screen are then tracked.

Additionally, touch pads may be used in conjunction with touch screen for two levels of two dimensional figure tracking, i.e., possible three dimensional tracking. Further, a location sensor, e.g., an electromagnetic sensor, may be attached to an object or figure. The location sensor may be responsive to movements within the structure and emit signals corresponding to the movement which are received by a tracking device. The tracking device may use the location sensor data as data to retrieve a different scene in response to the sensor data. For example, a tracking device may provide data to a computer 100 input such as a mouse 120 or joystick such that a new script, new sounds, and/or new images are presented to the user.

A series of movements and different interactions can result in a series of different images or scripts providing the potential for continuous interactive play sessions. In other words, analogous to a video game, specific movements or user input may result in specific images, sequences or images, or scripts. Thus, numerous images, whether for background or for interaction, may be portrayed, and different images may be presented in response to different figure movements in two dimensions.

Figure 11A:
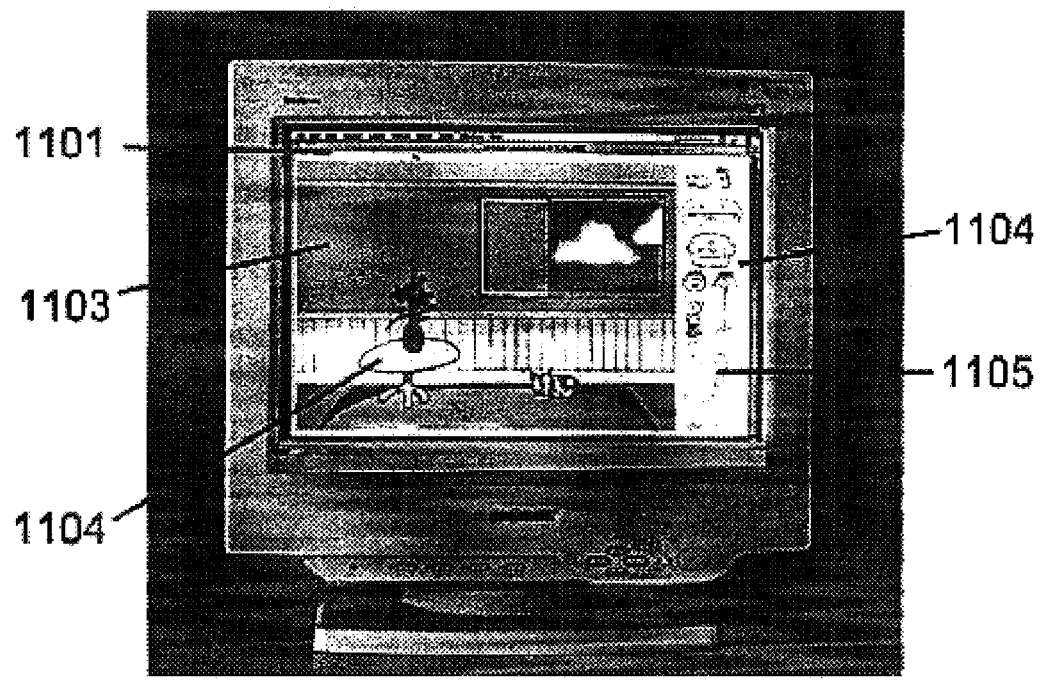
FIGS. 11A—C illustrates how computer enhanced play set images may be customized.
Figure 11B:
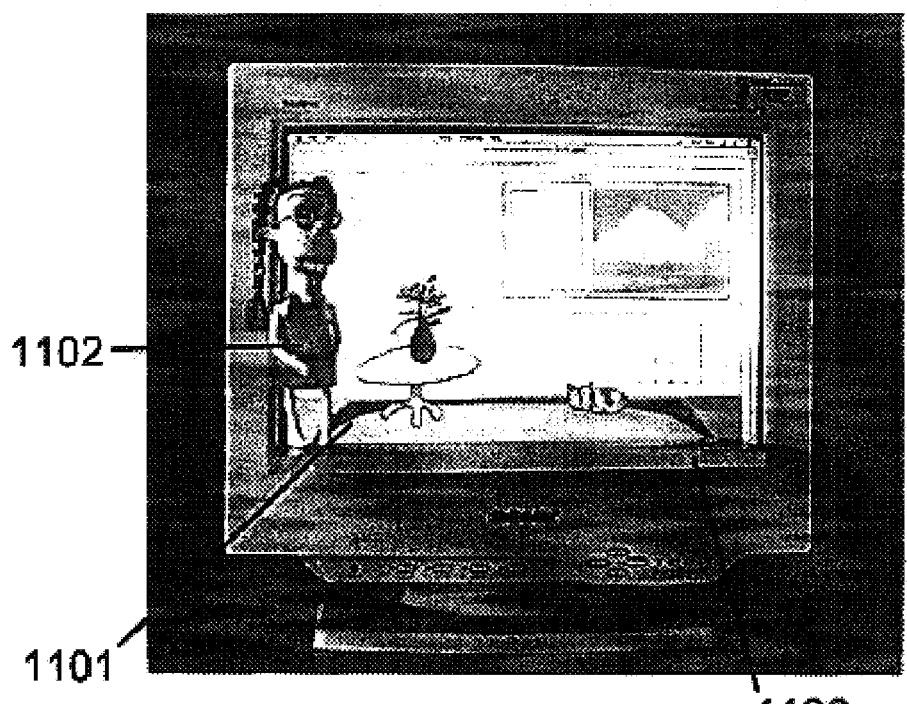
Figure 11C:
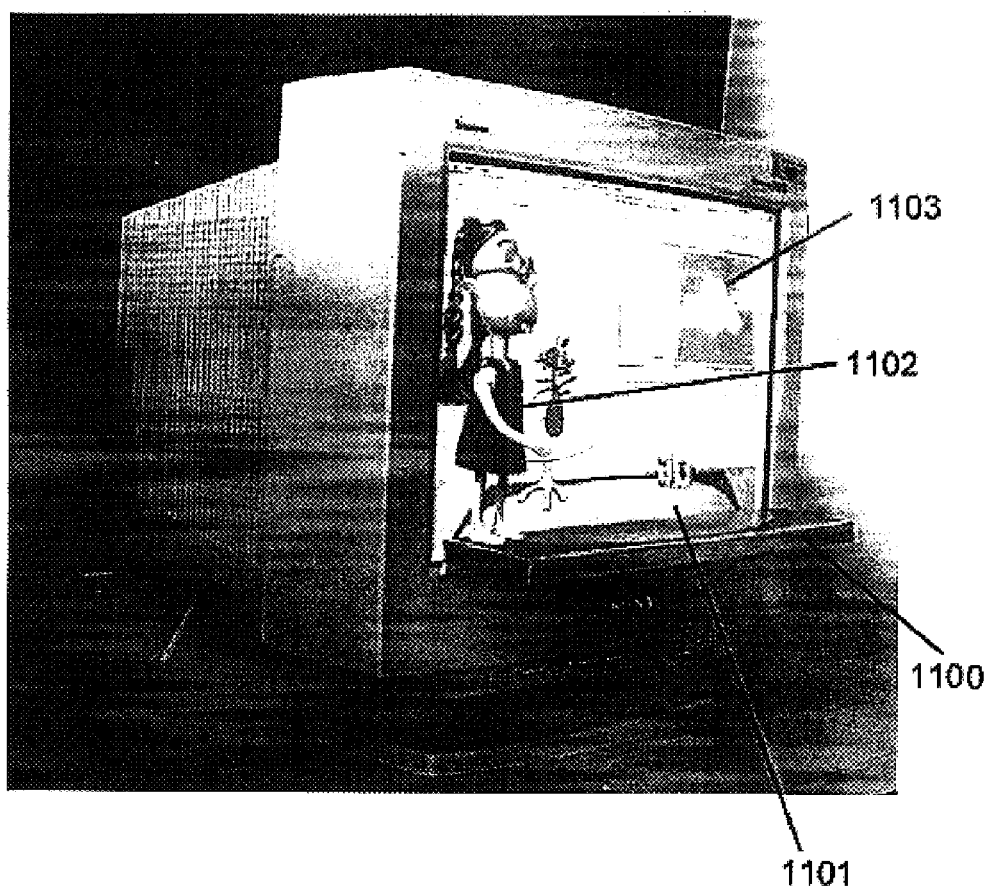

With reference to FIGS. 11A–C, another aspect of the computer enhanced play set is customizing images or scenes in display screen with user input. To illustrate this aspect of the invention, the following description and FIGS. 11A–C describe how a customized computer enhanced play set can be generated from beginning to end.

Assume, for example, display screen 1101 portrays a simple background scene 1103 with room with a window. Background scene 1103 may be retrieved from Internet 160, CD-ROM 130 or other storage medium. Further assume source for images, scenes, etc. which is external to or separated from the initial scene, e.g., a toolbar 1104, tool palette, or menu with various components or icons 1105. A toolbar is a row or column of on-screen buttons or icons used to activate functions in an application. A tool palette is a collection of icons grouped on a screen that provides a method of selecting available functions by pointing and clicking the representative icons. In one embodiment of the present invention, icons 1105 of a toolbar 1104, tool palette, or menu represent scenes, themes, settings, etc. components of scenes, characters, or other items. The scenes or characters represented by icons 1105 may be retrieved from Internet 160, CDROM 130, or other sources.

A user drag icons 1105 from tool bar 1104 to a location in scene 1103 within display monitor 1101. For example, with reference to FIG. 11, a user has selected a table and placed that table from the toolbar 1104 to the scene. In addition, a flower was selected from toolbar 1104 and placed on top of table, and a cat was dragged from toolbar 1104 to the scene. Toolbar 1104 includes various other icons 1105. Icons 1105 in this example include a couch, chair, lamp, child, mother, and father. Thus, a user can select from toolbar 1104 what components are to be included in the room and where they are located.

Additionally, play set structure 1100 may be attached to display monitor 1101 to compliment the customized scene 1103. A user may then manipulate a figure 1102 and play with and interact with structure 1101 and customized scenes 1103. Indeed, those skilled in the art will recognize that the above example is merely illustrative of the many possible customization possibilities.

Figure 12A:
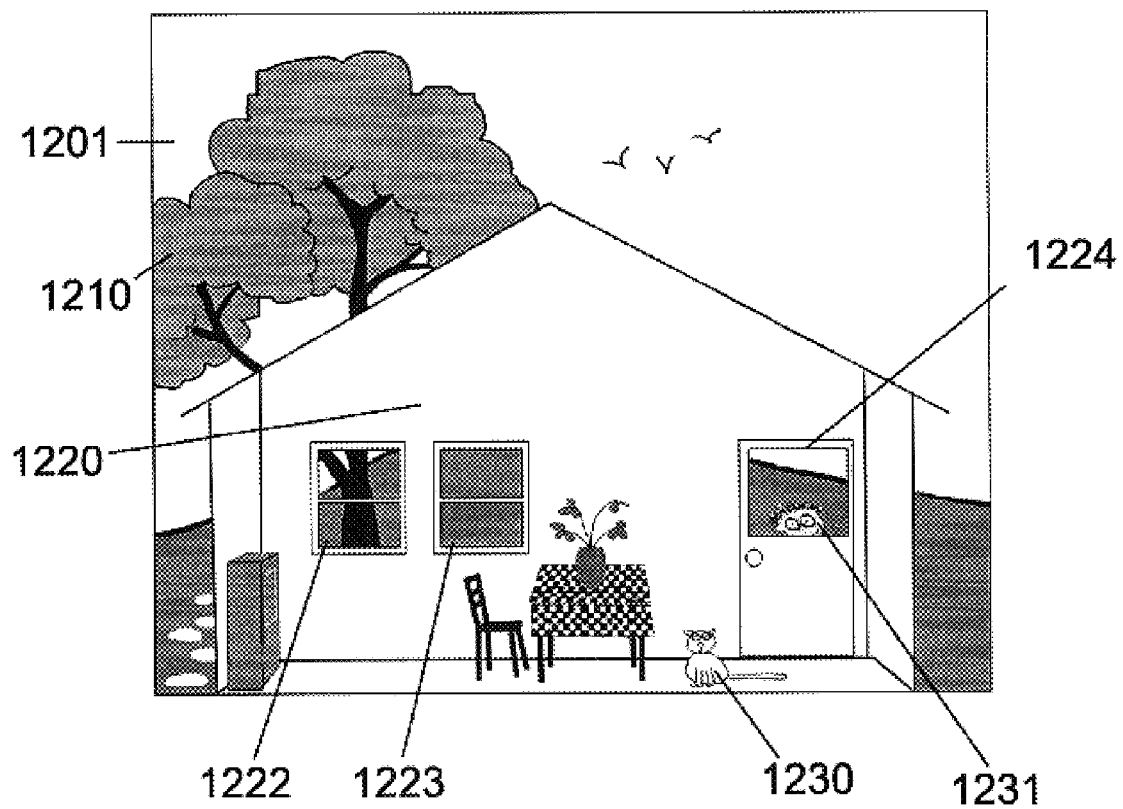
FIGS. 12A—C illustrate a detailed example of an enhanced computer enhanced play set.
Figure 12B:
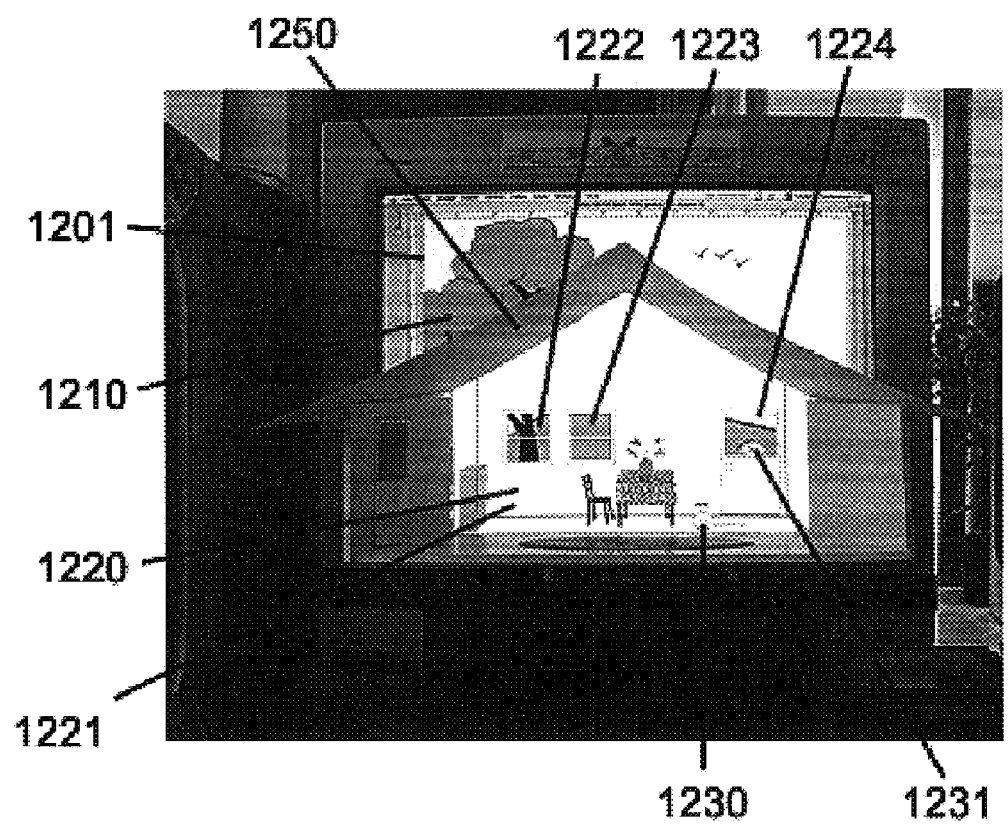
Figure 12C:
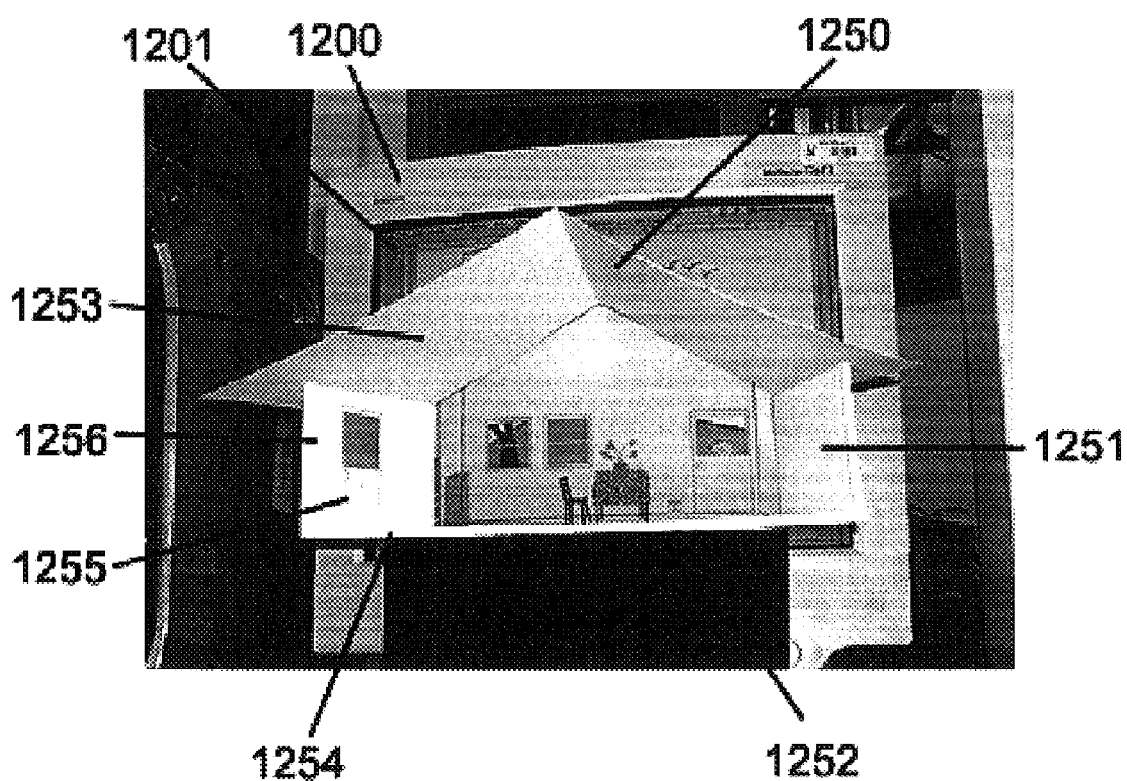

As a further enhancement on the previously described customized display screen in FIGS. 11A–C, toolbar 1104 may include icons that are capable of representing actual human intervention or actions. For example, toolbar 1104 may include icon 1105 of a telephone. A user may drag the telephone icon 1105 from toolbar 1104 to scene 1103. The telephone portrayed in the display screen may represent an actual, real-life telephone, albeit, a virtual telephone. In other words, a telephone line may be coupled to modem 150 of computer system 100. Incoming calls may be directed through modem 150 and represented in the virtual play set environment. For example if a child's father calls the child from work, a telephone, as represented by icon 1105 in scene 1103 receives the telephone call. The telephone icon 1105 rings, and in response, the child interacts with display through data inputs so as to answer the telephone call. For example, the child may move click on a ringing telephone icon 1105 to answer the telephone call. The child may then proceed to talk to her father, through the virtual telephone portrayed in the computer display 1101 of computer enhanced play set with a microphone or other computer telephone applications, including Internet telephone application, which are known in the art. The computer enhanced play set integrates these applications into customized, interactive, enhanced computer play sets. Additionally, some Internet 16 telephone services provide a picture of the person speaking in addition to transmitting the voice of that person. Thus, the child may see a picture of her father on the computer 100 screen to further enhance play sessions. Having described general attributes of the computer enhanced play set, FIGS. 12A–C illustrate an example play set that embodies many of the attributes previously discussed. Referring to FIG. 12A, display screen 1201 of display monitor 140 portrays scenes retrieved from Internet 160, CD-ROM 130, or some other source. In this example, display screen 1201 portrays an exterior scene 1210 and an interior scene 1220.

Exterior scene 1210 includes, for example, a hill, a tree, sky and birds. In this example, interior scene 1220 includes a room with a back wall 1221, windows 1222, 1223 and door 1224. Exterior scene 1210 is visible through windows 1222 and 1223 and door 1224.

Additionally, virtual figures 1230 and 12431 are retrieved from the internet 160, CD-ROM 130, or some other source. In this example, FIG. 1230 is a cat moving around the inside of the house and a child 1231 is knocking on the door 1224. Virtual figures 1230 and 12431 can move from the exterior 1210 to the interior 1220 through the windows 1222, 1223 or door 1224.

With reference to FIGS. 12B–C, play set structure 1250 is coupled to display screen 1201. In this particular example, structure 1250 is similar to structure 240 illustrated in FIG. 2B. More specifically, structure 1250 includes external vertical walls 1251, external base 1252, roof 1253, horizontal floor piece 1254 and door 1255.

This play set structure 1250 is attached to a display monitor 140 such that the components of play set structure 1250 match images portrayed in display screen 1201. In this example, play set structure 1250 is configured for particular scenes or scripts retrieved from Internet 160 or CD-ROM 130. Play set structure 1250 is configured such that the imagery of the exterior scene 1210 is actually outside the structure 1250 boundary, and the imagery of the interior 1220 of the house is contained within the structure 1250. In addition a user may customize the retrieved scene by adding additional images from a toolbar as previously described (not shown. For example, the user could put food in the cat 1230 dish such that the cat 1230 could eat. In response to figure movement, different images or scripts may be retrieved from Internet 160 or CD-ROM 130. One skilled in the art will recognize that a series of figure movements may result in a series of different images, sequences or scripts.

Of course, many other scenarios or scripts may be implemented and retrieved. Further, the computer enhanced play set is adaptable such that the physical play set structure may be removed if necessary to permit user interaction with display screen images apart from the physical play set structure.

Those skilled in the art will recognize that the computer enhanced play set can assume many forms, utilize many different tracking systems based on different data inputs of existing computer systems 100, be configured with various options, and portray numerous different scenes or scripts. The computer enhanced play set overcomes the shortcomings of conventional structures coupled to display screens by enabling a real object to be incorporated with computer images greatly enhancing interactive entertainment. Users are no longer limited by physical play set structures. Instead, users may interact with computer images which may change randomly or in response to movements within the play set. Thus, the present invention provides a whole new dimension to play sets.

The foregoing description of embodiments of the present invention have been presented for the purposes of illustration and description. It is not intended to be exhaustive or to limit the invention to the precise forms disclosed. Many modifications and variations are possible in light of the above teaching. For example, various types of computers, computer systems 100, or computer programs may be utilized with the computer enhanced play set. Additionally, images for the computer enhanced play set may be provided by or generated from various sources including, but not limited to, a diskette, tape, CD-ROM 130, Internet 160, or any other source capable of storing image or sound files. It is intended that the scope of the invention be limited not by this detailed description, but rather by the claims appended hereto.

What is claimed is:

1. An entertainment apparatus, comprising:
 a computer system comprising a video display screen; and
 a structure coupled to the video display screen, wherein a scene in the video display screen and the structure form an interactive entertainment environment;
 wherein the computer system further comprises one or more data inputs, and wherein data corresponding to movement of an object from a first location to a second location is provided to the data inputs; and wherein a second scene is displayed in response to the object movement from the first position to the second position.

2. An entertainment apparatus, comprising:
 a computer system comprising a video display screen; and
 a structure coupled to the video display screen, wherein a scene in the video display screen and the structure form an interactive entertainment environment;
 wherein the computer system further comprises one or more data inputs, and
 wherein data corresponding to movement of an object from a first location to a second location is provided to the data inputs;
 wherein the object movement is tracked in two dimensions; and
 wherein the two dimensional object movement is tracked through connections between the object and a base of the structure.

3. An interactive computer entertainment environment, comprising:
 a video display screen;
 a structure attached to the front of the display screen, wherein one or more objects are located within the attached structure;

one or more data inputs, wherein the one or more data inputs receive data corresponding to movements of the one or more objects from a first location to a second location; and a tracking system, wherein the tracking system determines the first and second locations of the one or more objects within the structure, and wherein the tracking system provides the object movement data to the one or more data inputs; and a digital data source, wherein digital data is retrieved from the digital data source and provided to the display screen based on the object movement data provided by the tracking system to the one or more data inputs.

4. An interactive computer entertainment environment, comprising:

a display screen;

a structure attached to the front of the display screen, wherein one or more objects are located within the attached structure;

one or more data inputs, wherein the one or more data inputs receive data corresponding to two dimensional movements of the one or more objects from a first location to a second location in a two dimensional plane; and a two dimensional tracking system which determines the two dimensional movements of the one or more object's within the structure, wherein the two dimensional tracking system provides the two dimensional object movement data to the one or more data inputs; and a digital data source, wherein digital data is retrieved from the digital data source and portrayed on the display screen based on the two dimensional object movement data provided by the two dimensional tracking system to the one or more data inputs.

5. An interactive computer entertainment set, comprising:

a video display screen on which images are presented;

a three dimensional structure attached to the front of the video display screen;

a displacable object placed in front of the display screen for movement relative thereto in at least two directions in a horizontal plane;

a location sensor responsive to the location of the object, wherein the location sensor generates signals indicative of the relative location of the object to the display screen in at least two perpendicular coordinates; and a tracking device which formats location sensor signals into data to which responsive data is retrieved; and a memory for storing data in digital form, wherein digital data is retrieved and presented on the video display screen in response to the tracking device data based on movements of objects detected by the location sensor.

6. A computer enhanced play set, comprising:

a three dimensional structure coupled to the front of a video display screen;

a location sensor, wherein the location sensor is attached to an object, and wherein the location sensor is responsive to movements of the object within the three dimensional structure; and a tracking device which determines the location of the object within the three dimensional structure based on signals from the location sensor.

7. A method for implementing an interactive computer entertainment environment, the method comprising:

associating a structure with a display screen of a computer system;

portraying a scene through the computer system, wherein an image of the scene portrayed in the display screen of the computer system and the structure form the interactive computer entertainment environment;

tracking a movement of an object within the structure from a first position to a second position; and displaying a second image on the display screen in response to the object movement.

8. The method of claim 7, wherein the scene comprises one or more images.

9. The method of claim 7, wherein the scene comprises one or more sounds.

10. The method of claim 7, wherein the second image is the same as the first image.

11. The method of claim 7, wherein the second image is different than the first image.

12. The method of claim 7, further comprising selecting the scene from a tool bar and added to the display screen image.

13. The method of claim 7, wherein the object movements are tracked in two dimensions.

14. The method of claim 13, wherein the two dimensional object movement is tracked through connections between the object and the structure base.

15. The method of claim 13, wherein the two dimensional object movement is tracked with input data to an input device of the computer system selected from the group comprising a mouse, a joystick, a touchpad, and a touchscreen.

16. The method of claim 7, wherein the second image is displayed after a predetermined amount of time.

17. The method of claim 7, wherein one or more walls of the structure portray a theme of the scene portrayed through the computer system.

18. The method of claim 7, wherein external human activity is simulated to a user through the interactive entertainment environment.

19. The method of claim 7, wherein the image is selected from the group comprising a background scene, an interactive scene, and a script.

20. A method for implementing an interactive computer entertainment environment, the method comprising:

associating a three dimensional structure with a display screen of a computer system;

portraying a scene through the computer system, wherein an image of the scene portrayed in the display screen of the computer system and the structure form the interactive computer entertainment environment;

tracking a two dimensional movement of an object within the three dimensional structure from a first position to a second position in a two dimensional plane; and displaying a second image on the display screen in response to the two dimensional object movement.

* * * * *